United States Patent
Sitter, Jr.

(10) Patent No.: US 10,969,578 B2
(45) Date of Patent: Apr. 6, 2021

(54) UNOBSCURED FIVE-MIRROR AFOCAL TELESCOPE

(71) Applicant: RAYTHEON COMPANY, Waltham, MA (US)

(72) Inventor: David N. Sitter, Jr., Torrance, CA (US)

(73) Assignee: RAYTHEON COMPANY, Waltham, MA (US)

(*) Notice: Subject to any disclaimer, the term of this patent is extended or adjusted under 35 U.S.C. 154(b) by 105 days.

(21) Appl. No.: 16/298,589

(22) Filed: Mar. 11, 2019

(65) Prior Publication Data

US 2020/0292811 A1    Sep. 17, 2020

(51) Int. Cl.
| | | |
|---|---|---|
| *G02B 23/00* | (2006.01) | |
| *G02B 27/00* | (2006.01) | |
| *G02B 23/04* | (2006.01) | |
| *G02B 23/06* | (2006.01) | |

(52) U.S. Cl.
CPC ......... *G02B 27/0081* (2013.01); *G02B 23/04* (2013.01); *G02B 23/06* (2013.01)

(58) Field of Classification Search
CPC .... G02B 17/00; G02B 17/06; G02B 17/0647; G02B 17/0663; G02B 23/00; G02B 23/02; G02B 23/04; G02B 27/0081
USPC ............. 359/364–366, 399, 853, 856–861
See application file for complete search history.

(56) References Cited

U.S. PATENT DOCUMENTS

| | | | |
|---|---|---|---|
| 4,804,258 A | 2/1989 | Kebo | |
| 5,847,879 A * | 12/1998 | Cook | G02B 13/06 359/631 |
| 6,495,839 B1 * | 12/2002 | Dinger | G03F 7/70233 250/492.2 |
| 6,902,282 B2 | 6/2005 | Cook | |
| 7,283,307 B2 * | 10/2007 | Couture | G02B 13/22 250/226 |
| 7,781,750 B2 * | 8/2010 | Singer | G03F 7/70075 250/504 R |
| 2008/0186568 A1 | 8/2008 | Chen et al. | |
| 2012/0019791 A1 * | 1/2012 | Abe | G03B 21/28 353/99 |
| 2014/0253999 A1 | 9/2014 | Hegg | |

(Continued)

OTHER PUBLICATIONS

International Search Report and Written Opinion of International Patent Application No. PCT/US2019/060186 dated Jun. 4, 2020.

(Continued)

*Primary Examiner* — Thong Q Nguyen

(74) *Attorney, Agent, or Firm* — Lando & Anastasi, LLP

(57) ABSTRACT

An unobscured five-mirror afocal telescope includes an aperture configured to direct electromagnetic radiation to first, second, third, fourth and fifth mirrors, each configured to receive electromagnetic radiation and reflect electromagnetic radiation along a beam path. The five mirrors are arranged to sequentially reflect from one another electromagnetic radiation received via the aperture to produce a collimated output beam of the electromagnetic radiation at an exit pupil, with the five mirrors consisting of a three-element objective and a two-element eyepiece. A beam splitter may be disposed between the first mirror and the second mirror to direct short-wavelength electromagnetic radiation toward a device along a separate path.

22 Claims, 7 Drawing Sheets

(56) References Cited

U.S. PATENT DOCUMENTS

2016/0178909 A1* 6/2016 Komatsu .............. G02B 17/086
 345/8
2017/0090171 A1 3/2017 Cook
2020/0026161 A1* 1/2020 Eguchi ............... G02B 17/0663

OTHER PUBLICATIONS

Silny, J., et al. "Optically fast, wide field-of-view, five mirror anastigmat (5MA) imagers for remote sensing applications," Imaging Spectrometry XVI, edited by Sylvia S. Shen, Paul E. Lewis, Proc. of SPIE vol. 8158, 815804 (2011).

Sampath, D., et al. "The WISE telescope and scanner: Design choices and hardware results," An Optical Believe It or Not: Key Lessons Learned II, edited by Mark A. Kahan, Proc. of SPIE, vol. 7796, 779609 (2010).

\* cited by examiner

UNOBSCURED FIVE-MIRROR AFOCAL TELESCOPE

BACKGROUND OF THE INVENTION

This invention relates generally to optical systems and, more particularly, to an unobscured five-mirror afocal telescope with optional extensions to provide a companion telescope path with a common primary mirror.

Reflective optical systems are desirable for many optical applications because they reflect all wavelengths of incident light equally, unlike refractive systems in which refraction is wavelength dependent. Reflective optical systems may also be made quite compact.

Wide field of view (WFOV) optical systems, such as reflective afocal telescopes are used in a variety of applications, such as multispectral applications and certain space sensor systems, for example. Object space may be viewed via the telescope exit pupil by various types of sensors which include an imaging (focal) optical system and a detector, such as a focal plane array. Five-mirror focal and afocal telescopes are disclosed in U.S. Pat. No. 6,902,282 and U.S. Patent Application Publication No. 2017/0090171 A1, both assigned the assignee of the present disclosure and incorporated herein by reference in their entirety.

In prior embodiments, active and passive functions over disparate wavebands were implemented with separate sensors. Current electro-optical applications desire to combine these functions into a single sensor. There is a need for optical telescopes that can combine both active and passive modes, but these functions can require different layouts. For instance, high power laser systems may require telescopes with no internal focus to avoid high energy densities whereas telescopes for WFOV passive imaging applications need relayed pupils which requires an internal focus. In addition, some scanning functions require prescribed angular field mappings. Traditional telescope designs cannot provide the functionality needed.

SUMMARY OF INVENTION

One aspect of the present disclosure is directed to an unobscured five-mirror afocal telescope configured to direct electromagnetic radiation along a beam path. In one embodiment, the telescope comprises an aperture configured to direct electromagnetic radiation, a first mirror configured to receive electromagnetic radiation from the aperture and reflect electromagnetic radiation along the beam path, a second mirror configured to receive electromagnetic radiation from the first mirror and to reflect electromagnetic radiation along the beam path, a third mirror configured to receive electromagnetic radiation from the second mirror and to reflect electromagnetic radiation along the beam path, a fourth mirror configured to receive electromagnetic radiation from the third mirror and to reflect electromagnetic radiation along the beam path, and a fifth mirror configured to receive electromagnetic radiation from the fourth mirror and to reflect electromagnetic radiation along the beam path. The five mirrors are arranged to sequentially reflect from one another electromagnetic radiation received via the aperture to produce a collimated output beam of the electromagnetic radiation at an exit pupil, with the five mirrors consisting of a three-element objective and a two-element eyepiece.

Embodiments of the telescope further may include a beam splitter disposed between the first mirror and the second mirror, with the beam splitter being configured to direct short-wavelength electromagnetic radiation toward a device along a separate path. The telescope further may include refractive or reflective component elements disposed along the separate path. Refractive elements may include spherical and cylindrical lenses that may be laterally offset and titled to compensate wave front error and afocal magnification over the field of view. The telescope further may include at least one powered mirror disposed along the separate path.

Another aspect of the present disclosure is directed to an unobscured five-mirror afocal telescope comprising a first mirror arranged and configured to receive and reflect collimated electromagnetic radiation received via an aperture along a beam path, a second mirror arranged and configured to receive and further reflect electromagnetic radiation reflected from the primary mirror along the beam path, a third mirror arranged and configured to receive and further reflect electromagnetic radiation reflected from the secondary mirror along the beam path, a fourth mirror arranged and configured to receive and further reflect electromagnetic radiation reflected from the third mirror along the beam path, a fifth mirror configured to receive and re-collimate electromagnetic radiation reflected from the fourth mirror and to reflect re-collimated electromagnetic radiation through an exit pupil of the afocal telescope, and a beam splitter disposed between the first mirror and the second mirror. The beam splitter is configured to direct short-wavelength electromagnetic radiation toward a device along a separate path.

Embodiments of the telescope further may include refractive or reflective component elements disposed along the separate path. Refractive elements may include spherical and cylindrical lenses that may be laterally offset and titled to compensate wave front error and afocal magnification over the field of view. The telescope further may include at least one powered mirror disposed along the separate path. The five mirrors may be arranged to sequentially reflect from one another electromagnetic radiation received via the aperture to produce a collimated output beam of the electromagnetic radiation at an exit pupil, the five mirrors consisting of a three-element objective and a two-element eyepiece.

Yet another aspect of the present disclosure is directed to a method of directing electromagnetic radiation along an optical path of an unobscured five-mirror afocal telescope. In one embodiment, the method comprises: directing electromagnetic radiation from an aperture to a first mirror configured to receive electromagnetic radiation from the aperture and reflect electromagnetic radiation along the beam path; directing electromagnetic radiation from the first mirror to a second mirror configured to receive electromagnetic radiation from the first mirror and to reflect electromagnetic radiation along the beam path; directing electromagnetic radiation from the second mirror to a third mirror configured to receive electromagnetic radiation from the second mirror and to reflect electromagnetic radiation along the beam path; directing electromagnetic radiation from the third mirror to a fourth mirror configured to receive electromagnetic radiation from the third mirror and to reflect electromagnetic radiation along the beam path; and directing electromagnetic radiation from the fourth mirror to a fifth mirror configured to receive electromagnetic radiation from the fourth mirror and to reflect electromagnetic radiation along the beam path. The five mirrors are arranged to sequentially reflect from one another electromagnetic radiation received via the aperture to produce a collimated output beam of the electromagnetic radiation at an exit pupil, with the five mirrors consisting of a three-element objective and a two-element eyepiece.

Embodiments of the method further may include directing short-wavelength electromagnetic radiation toward a device along a separate path. Directing short-wavelength electromagnetic radiation may be achieved by a beam splitter disposed between the first mirror and the second mirror. Directing short-wavelength electromagnetic radiation further may be achieved by refractive or reflective component elements disposed along the separate path. Refractive elements may include spherical and cylindrical lenses that may be laterally offset and titled to compensate wave front error and afocal magnification over the field of view. Directing short-wavelength electromagnetic radiation further may be achieved by at least one powered mirror disposed along the separate path.

Another aspect of the present disclosure is directed to a method of directing electromagnetic radiation along an optical path of an unobscured five-mirror afocal telescope. In one embodiment, the method comprises: directing electromagnetic radiation to a first mirror arranged and configured to receive and reflect collimated electromagnetic radiation received via an aperture along a beam path; directing electromagnetic radiation from the first mirror to a second mirror arranged and configured to receive and further reflect electromagnetic radiation reflected from the primary mirror along the beam path; directing electromagnetic radiation from the second mirror to a third mirror arranged and configured to receive and further reflect electromagnetic radiation reflected from the secondary mirror along the beam path; directing electromagnetic radiation from the third mirror to a fourth mirror arranged and configured to receive and further reflect electromagnetic radiation reflected from the third mirror along the beam path; directing electromagnetic radiation from the fourth mirror to a fifth mirror configured to receive and re-collimate electromagnetic radiation reflected from the fourth mirror and to reflect re-collimated electromagnetic radiation through an exit pupil of the afocal telescope; and directing short-wavelength electromagnetic radiation toward a device along a separate path.

Embodiments of the method further may include directing short-wavelength electromagnetic radiation by a beam splitter disposed between the first mirror and the second mirror. Directing short-wavelength electromagnetic radiation further may be achieved by one of refractive component elements and at least one powered mirror disposed along the separate path. Refractive elements include spherical and cylindrical lenses that may be laterally offset and titled to compensate wave front error and afocal magnification over the field of view.

A further aspect of the present disclosure is directed to an unobscured five-mirror afocal telescope comprising five mirrors arranged to sequentially reflect from one another electromagnetic radiation received via a system entrance pupil to produce a collimated output beam of the electromagnetic radiation at a system exit pupil, with the five mirrors consisting of a three-element objective and a two-element eyepiece.

Embodiments of the telescope further may include a beam splitter disposed between the first mirror and the second mirror, with the beam splitter being configured to direct short-wavelength electromagnetic radiation toward a device along a separate path. The telescope further may include refractive or reflective component elements disposed along the separate path. Refractive elements include spherical and cylindrical lenses that may be laterally offset and titled to compensate wave front error and afocal magnification over the field of view. The telescope further may include at least one powered mirror disposed along the separate path. The five mirrors may consist of a first mirror arranged and configured to receive and reflect electromagnetic radiation from the entrance pupil along a beam path, a second mirror arranged and configured to receive and further reflect electromagnetic radiation reflected from the first mirror along the beam path, a third mirror arranged and configured to receive and further reflect electromagnetic radiation reflected from the second mirror along the beam path, a fourth mirror arranged and configured to receive and further reflect electromagnetic radiation reflected from the third mirror along the beam path, and a fifth mirror configured to receive and re-collimate electromagnetic radiation reflected from the fourth mirror and to reflect re-collimated electromagnetic radiation through the exit pupil to provide the collimated output beam.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence is intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION OF THE INVENTION

Figure 1:
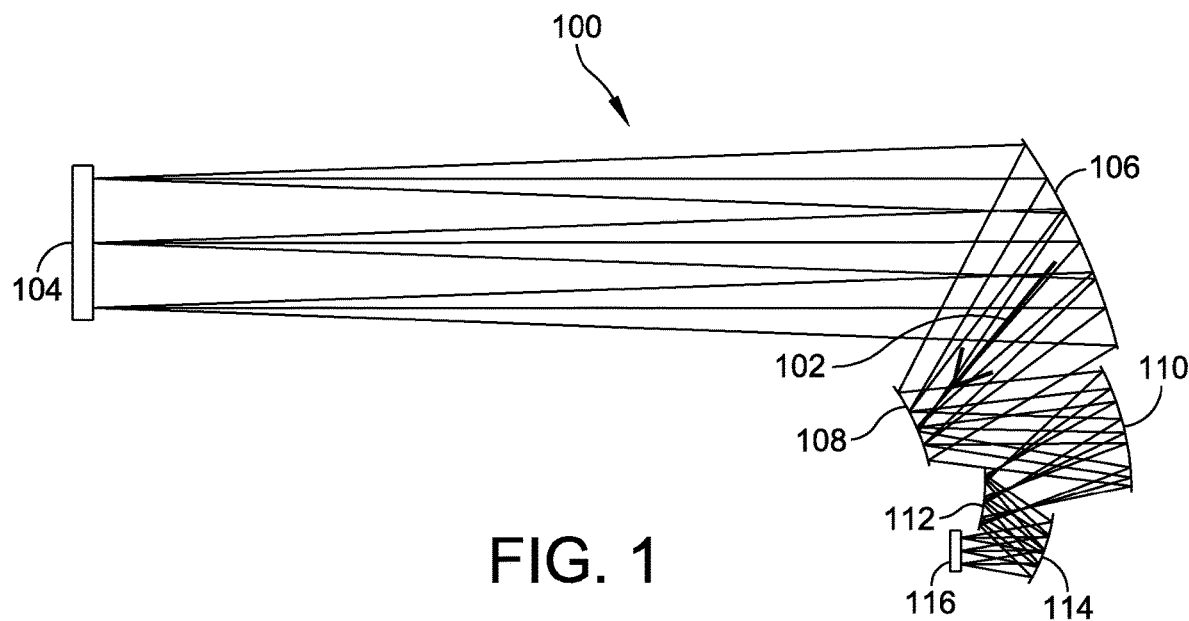
FIG. 1 is a schematic view of an unobscured five-mirror afocal telescope of an embodiment of the present disclosure.

Embodiments of the present disclosure are directed to a five-mirror all-reflective afocal telescope, particularly, an afocal five-mirror anastigmat (5MA) that extends the usable field of view (FOV) relative to conventional three-mirror or four-mirror anastigmat designs, while also providing other additional advantages. Embodiments of the afocal 5MA extend the usefulness of the all-reflective optical form, such as wideband spectral coverage, to larger fields of view, for example, approaching 10° circular FOV, with improved performance metrics and in certain examples, reduced physical size for comparable parameters.

As referenced above, U.S. Pat. No. 6,902,282 provides an example of a five-mirror all-reflective relayed focal optical system. The focal optical system includes a first mirror receiving the beam path from a real entrance pupil, and a second mirror receiving the beam path reflected from the first mirror. The first mirror and the second mirror together function as a multi-mirror reflective objective optical component that forms an intermediate image after the beam path reflects from the second mirror. The focal optical system further includes a third mirror that reflects the intermediate image, a fourth mirror that reflects the beam path previously reflected by the third mirror, and a fifth mirror that reflects and focuses the beam path previously reflected by the fourth mirror to an exit pupil. A real image of the real entrance pupil is formed at a re-imaged pupil location between the fifth mirror and the exit pupil. A system aperture stop may be placed at this re-imaged pupil location. The third mirror, fourth mirror, and fifth mirror together function as a multi-mirror relay optical component that relays the intermediate image to the final exit pupil in the beam path. Thus, the five-mirror design of the system can be considered as a two-mirror focal or imaging objective (which produces the intermediate image) and a three-mirror focal relay that produces the final image at the exit pupil. An unpowered flat mirror optionally can be included in the beam path, serving as a fold mirror to redirect the beam path, but is not considered one of the five mirrors of the five-mirror relayed focal optical system.

The defining characteristic of a focal optical system is that it produces as an output a focused image at a specified image plane. For example, the system receives collimated light as an input at the entrance pupil and produces as an output an image at the exit pupil. In contrast, an afocal optical system is defined by producing a collimated output from a collimated input. Thus, the design and arrangement of the mirrors making up a focal versus an afocal system are vastly different because the combination of optical powers and arrangement of the mirrors in a focal system must be selected to achieve an output image; whereas the combination of optical powers and arrangement of mirrors in an afocal system must be selected to achieve a collimated (i.e., focused to infinity, or having parallel rays) output. In addition, due to the fundamentally different nature of the output of the two systems (image versus collimated), the optical design parameters for the various mirrors (e.g., surface shape, conic features, optical power, etc.) that must be considered in order to achieve compensation for optical aberrations are also significantly different.

As discussed above, an afocal optical system is often used as the front optics for an overall system, and its collimated output is provided as the input to a subsequent focal (imaging) optical system that produces an output image for viewing or analysis. The relayed form of the described focal system is particularly well suited to this type of application because, with the real entrance pupil being the image of a real aperture stop, the optical system can follow another optical system (such as a high magnification afocal telescope) and be ideally matched pupil-to-pupil.

Being all-reflective, the telescope can be used over many wavelength bands. However, for active sensors, the laser beam focuses within the telescope. The internal image quality can be degraded to the point where air-breakdown is avoided. However, it would be preferred if the laser beam never came to a focus.

U.S. Patent Application Publication No. 2017/0090171 A1 builds upon the five-mirror optical system disclosed in U.S. Pat. No. 6,902,282. As disclosed, an afocal optical system includes five non-spherical mirrors. The afocal 5MA includes a first mirror that receives electromagnetic radiation, also referred to as the beam path, via an entrance pupil. The first mirror has positive optical power, and reflects the electromagnetic radiation toward a second mirror. The second mirror has negative optical power. The second mirror receives the electromagnetic radiation reflected from the first mirror and reflects the electromagnetic radiation toward a third mirror. The third mirror has positive optical power. The third mirror receives the electromagnetic radiation reflected from the second mirror and further reflects the electromagnetic radiation toward a fourth mirror. The fourth mirror has negative optical power. The fourth mirror receives the electromagnetic radiation reflected from the third mirror and further reflects the electromagnetic radiation toward a fifth mirror having positive optical power. The fifth mirror receives the electromagnetic radiation reflected from the fourth mirror and reflects and re-collimates the electromagnetic radiation to focus at infinity to provide a collimated output beam at the exit pupil.

Corresponding ray pairs in the output beam are parallel in accord with the definition of a collimated output beam (focused at infinity). The afocal 5MA thus receives a collimated input beam of the electromagnetic radiation at the entrance pupil and produces a collimated output beam of the electromagnetic radiation at the exit pupil. In one example, the afocal 5MA has a + − + − + optical power distribution. The first, second, third, and fourth mirrors are configured to cooperate to form an intermediate image that is located between the fourth mirror and the fifth mirror. The fifth mirror re-collimates the electromagnetic radiation from the intermediate image to provide the collimated output beam at the exit pupil. Thus, the afocal 5MA can be considered to include a four-mirror objective (formed by the first, second, third, and fourth mirrors, which precede the intermediate image) followed by a one-mirror re-collimating eyepiece (the fifth mirror).

Alternatively, the afocal 5MA can be considered as a two-mirror afocal Mersenne telescope (defined by the + − optical power distribution of the first and second mirrors) followed by a three-mirror afocal pupil relay (formed by the third, fourth, and fifth mirrors). As discussed above, in one example this three-mirror afocal pupil relay has a +− + optical power distribution. The optical power of the three positive mirrors is balanced by the optical power of two negative mirrors to provide a zero Petzval curvature or a flat field condition at the exit pupil. Further, the negative optical power of both the second mirror and the fourth mirror is available to balance the field curvature of the other three mirrors, advantageously allowing for improvement in performance metrics.

In one embodiment, the entrance pupil is positioned in front of the first mirror, and this entrance pupil is offset vertically from the system optical axis. An aperture stop can be positioned at the entrance pupil. In one embodiment, the system is configured to be off axis in aperture only, or in another embodiment to be off axis both aperture and field to produce or determine the positions of the reflective surface of the first mirror and the exit pupil. In either example, neither the entrance pupil nor the exit pupil is centered on the optical axis. Any or all of the second, third, fourth, and fifth mirrors can be tilted and decentered to improve the optical performance of the system.

The field of view in at least one axis (the major axis) exceeds about 15 degrees, preferably exceeds about 20 degrees, and most preferably exceeds about 25 degrees. Such large fields of view are important in scanning imaging applications, such as those where the optical system is scanned across a scene. These large fields of view cannot be achieved with a conventional optical system. Even at these large major-axis fields of view, the image quality is diffraction limited at a wavelength of about 1 micron across the field of view. The image quality is good, even at the limits of the field of view, with low pupil aberrations and low field distortions of less than one percent.

Current optical systems exhibit all of the defining characteristics and resulting benefits of a relayed optical form. It has a real entrance pupil that is reimaged (or relayed) to a real aperture stop located between the last powered mirror and the final image plane, and it has an intermediate image formed within the optical system prior to the formation of the aperture stop and final image. The main benefits of a relayed optical system are threefold. First, the arrangement aids in the suppression of unwanted stray light by compartmentalizing the optical path into several well-defined regions: the region between the entrance pupil and the field stop (located at the intermediate image), the region between the field stop and the aperture stop, and the region between the aperture stop and the final image. Second, the arrangement provides all of the features necessary to establish complete cold shielding for the low background operation of infrared focal plane arrays: with the cold stop defined at the aperture stop location, the infrared focal plane array views only cold high-emissivity surfaces back of the cold stop, or warm low-emissivity mirror surfaces in front of the cold stop. Direct view of any warm high-emissivity structure is precluded. Third, the arrangement, with its real entrance pupil being the image of a real aperture stop, allows this optical system to either follow another optical system (such as a high magnification a focal telescope) and be ideally matched pupil-to-pupil, or this optical system can directly view a scene through a small window or port that is minimally sized for the entrance pupil only, with no unwanted size growth associated with the large field of view. These features are not available in non-relayed optical systems.

Embodiments of the present disclosure are directed to a five-mirror afocal telescope. As a telescope the design form itself is useful. However, the telescope has a different location for the intermediate image which significantly changes the nature of the design. In particular, the design lends itself to allowing a dichroic beam splitter to be inserted between the primary mirror and the secondary mirror. The beam splitter allows the design of a companion telescope that shares the primary mirror. This second telescope can be designed to not have an internal image.

The five-mirror afocal telescope of an embodiment of the present disclosure implements an arrangement of optical elements about the intermediate image. In one embodiment, there is a three-element objective and a two-element eyepiece. The distribution of optical power among the elements leads to different design characteristics than other design forms. As one example, a companion telescope which shares the primary mirror can be designed that does not have an internal image. The shared primary mirror allows for a common aperture design for active and passive paths. In addition, by using mirrors with polynomial departures from conics the field mapping of the telescope can be optimized to be rotationally symmetric and have a prescribed field mapping, such as $\Theta_i = M \Theta_o$.

Referring to the drawings, FIG. 1 illustrates an unobscured five-mirror afocal telescope, which is generally indicated at 100. As shown, in one embodiment, the telescope 100 is configured to direct light (passive) and/or electromagnetic radiation (active), together referred to as "electromagnetic radiation," along an optical path 102, and includes an aperture 104 that is spaced apart from a primary or first mirror 106. In this embodiment, the design provides generous eye relief for an entrance pupil, with electromagnetic radiation being directed from the aperture 104 to the first mirror 106. Eye relief is the distance from a real pupil to the optical assembly. Long eye relief allows scan mirrors to be inserted in the path mirrors or the fold mirror to be inserted for packaging purposes.

The telescope 100 further includes a secondary or second mirror 108 that receives electromagnetic radiation reflected from the first mirror 106. The telescope 100 further includes a third mirror 110 that receives electromagnetic radiation reflected from the second mirror 108, a fourth mirror 112 that receives electromagnetic radiation from the third mirror 110, and a fifth mirror 114 that receives electromagnetic radiation from the fourth mirror 112 and focuses the electromagnetic radiation to a real exit pupil at location 116. The telescope 100 further may be configured to generate a real image of a real entrance pupil, which is formed at a re-imaged pupil location between the fifth mirror 114 and the exit pupil 116. The mirrors 106, 108, 110, 112, 114 of the telescope 100 are configured to achieve a three plus two design form having a three-element objective and a two-element eyepiece. The telescope is able to provide long eye relief. In addition, the three plus two design form allows the spacing between the primary mirror and the secondary mirror to be large enough for a beam splitter to be inserted, allowing for an alternate optical path through the telescope with a shared primary mirror.

Figure 2A:
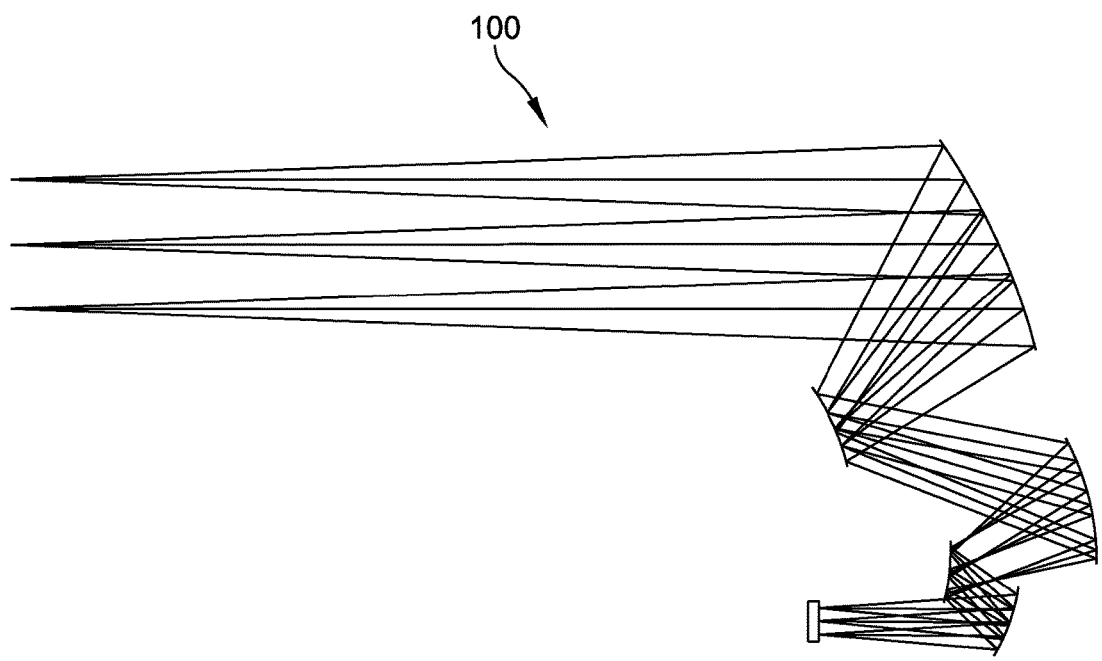
FIGS. 2A and 2B are views showing angular field mapping control of an unobscured five-mirror afocal telescope of embodiments of the present disclosure.
Figure 2B:
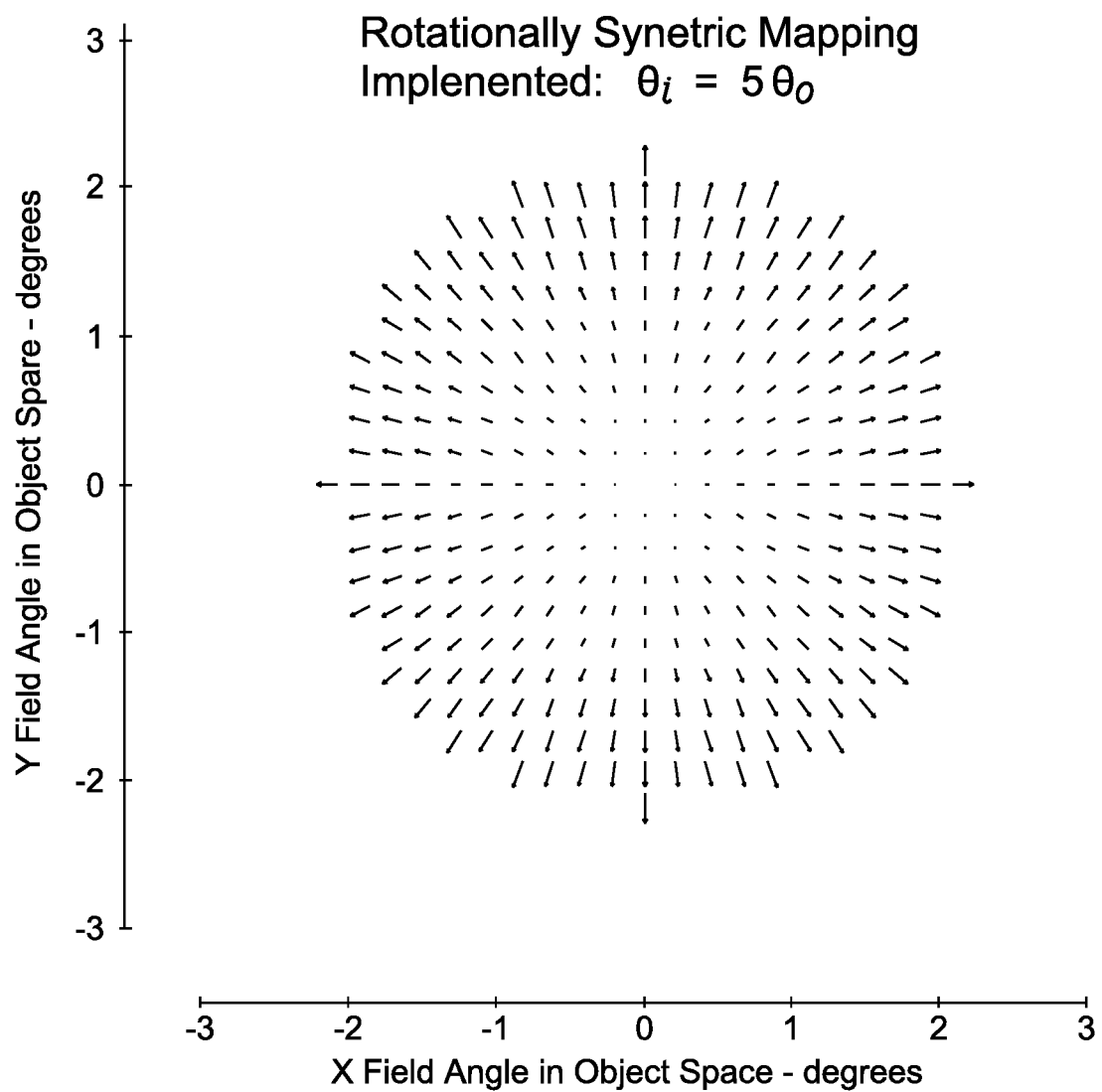

FIGS. 2A and 2B illustrate an angular field mapping control of the telescope 100 shown in FIG. 1. As shown, with the use of free-form mirrors, e.g., conics with general polynomial surface deformations, a specific and general angular field mapping can be achieved. In the shown embodiment, rotationally symmetric mapping implemented is $\Theta_i = 5 \Theta_o$, even though the optical prescription is off-axis in aperture and field. Traditional off-axis designs with rotationally symmetric optical mirrors cannot produce specific and general field mappings.

Figure 3:
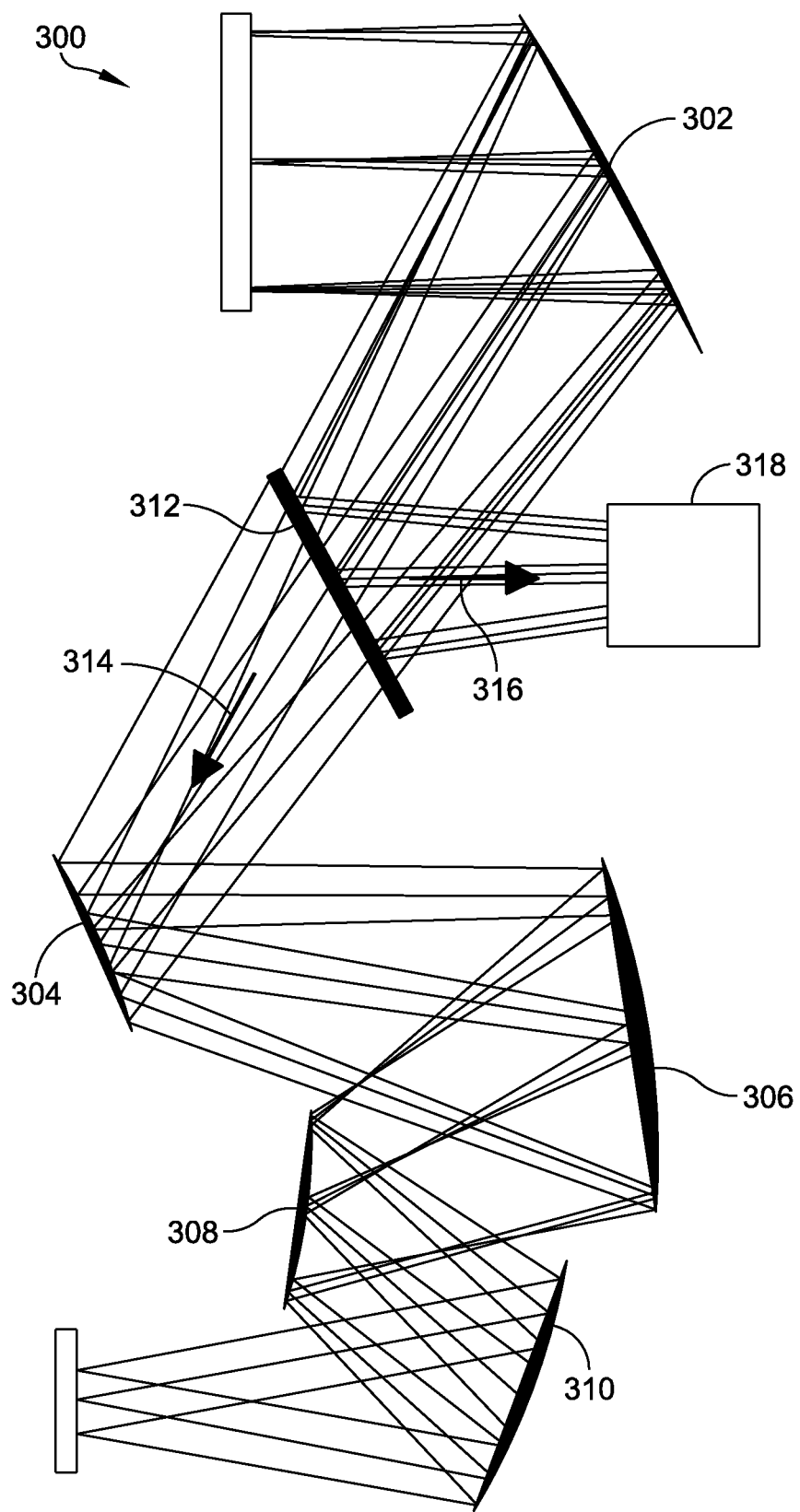
FIG. 3 is a schematic view of an unobscured five-mirror afocal telescope of another embodiment of the present disclosure.

Referring to FIG. 3, in another embodiment, an unobscured five-mirror afocal telescope, generally indicated at 300, includes an aperture and a primary or first mirror 302 that receives electromagnetic radiation directed from the aperture. The telescope 300 further includes a secondary or second mirror 304 that receives electromagnetic radiation reflected from the first mirror 302. The telescope 300 further includes a third mirror 306 that receives electromagnetic radiation reflected from the second mirror 304, a fourth mirror 308 that receives electromagnetic radiation from the third mirror 306, and a fifth mirror 310 that receives electromagnetic radiation from the fourth mirror 308 and focuses the electromagnetic radiation to a real exit pupil image. As with telescope 100, the mirrors 302, 304, 306, 308, 310 of the telescope 300 are configured to achieve a three plus two design form having a three-element objective and a two-element eyepiece.

The telescope 300 further includes a beam splitter 312 disposed between the first mirror 302 and the second mirror 304. A beam splitter is an optical device that splits a beam of electromagnetic radiation in two. In one embodiment, the beam splitter 312 is in the form of a cube made from two triangular glass prisms which are glued together at their base using polyester, epoxy or urethane-based adhesives. The thickness of the resin layer can be adjusted for a certain wavelength to enable half of the light incident through one port, e.g., the face of the cube, is reflected and the other half is transmitted. In a certain embodiment, the beam splitter 312 is a dichroic beam splitter, in which a dichroic coating is applied. Depending on its characteristics, the ratio of reflection to transmission will vary as a function of the wavelength of the incident light.

The beam splitter 312 enables the long-wavelength electromagnetic radiation to pass through the remainder of the telescope 300 along an optical path 314 and reflects a short-wavelength electromagnetic radiation to another, separate optical path 316. In one embodiment, the separate optical path 316 directs the short-wavelength electromagnetic radiation to a short-wavelength infrared (SWIR) detection device 318.

Figure 4:
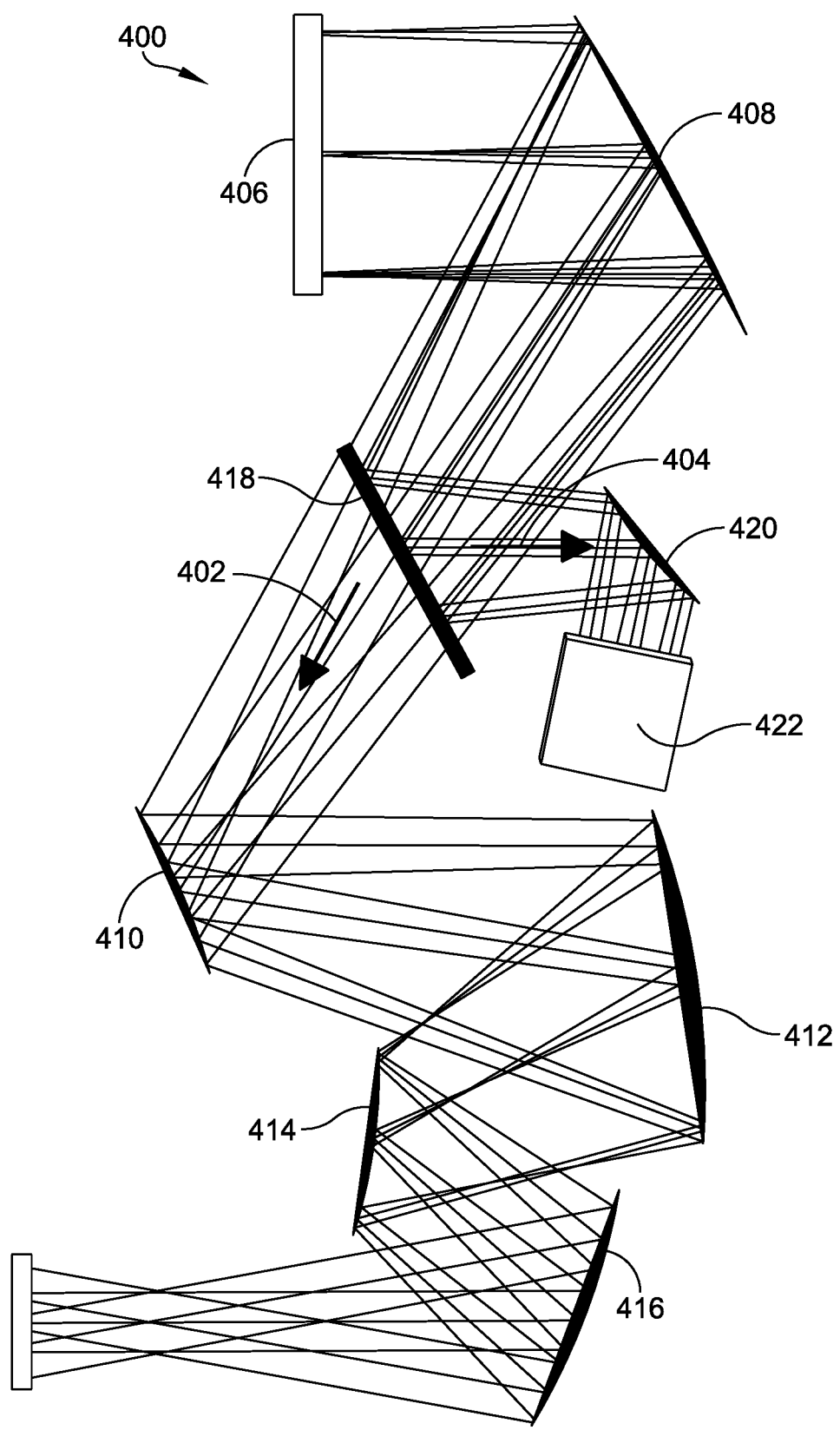
FIGS. 4 and 5 are schematic views showing an unobscured five-mirror afocal telescope having an imaging path combined with an active path with no internal focus of an embodiment of the present disclosure.
Figure 5:
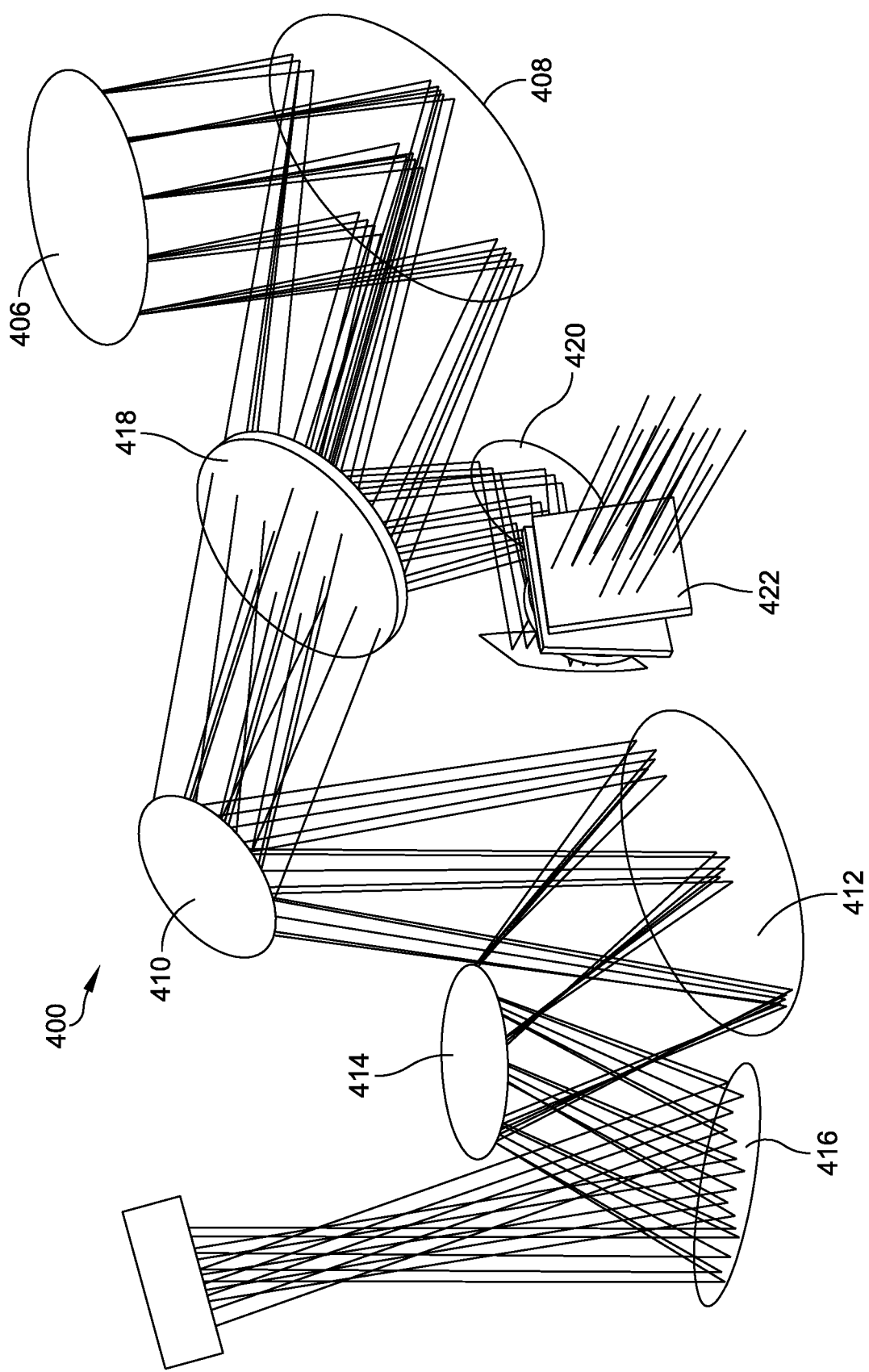

FIGS. 4 and 5 show an unobscured five-mirror afocal telescope, generally indicated at 400, having a passive imaging path (long-wavelength) and an active path (short-wavelength) with no internal focus. The arrangement is such that the telescope 300 of FIG. 3 in essence creates two afocal telescopes that share a common primary mirror. The passive imaging path transmits static images, e.g., landscape, and the active imaging path reflects active light, e.g., laser light. Specifically, the telescope includes an aperture 406 (entrance pupil) and a primary or first mirror 408 that receives electromagnetic radiation directed from the aperture 406. The telescope 400 further includes a secondary or second mirror 410 that receives electromagnetic radiation reflected from the first mirror 408. The telescope 400 further includes a third mirror 412 that receives electromagnetic radiation reflected from the second mirror 410, a fourth mirror 414 that receives electromagnetic radiation from the third mirror 412, and a fifth mirror 416 that receives electromagnetic radiation from the fourth mirror 414 and focuses the electromagnetic radiation to an exit pupil. As with telescopes 100, 300, the mirrors 408, 410, 412, 414, 416 of the telescope 400 are configured to achieve a three plus two design form having a three-element objective and a two-element eyepiece.

The telescope 400 further includes a beam splitter 418 disposed between the first mirror 408 and the second mirror 410. The beam splitter 418 enables the long-wavelength electromagnetic radiation to pass through the remainder of the telescope 400 along the passive imaging or optical path 402 and reflects a short-wavelength electromagnetic radiation to the active imaging or separate optical path 404. In one embodiment, the separate optical path 404 directs the short-wavelength electromagnetic radiation to a short-wavelength infrared (SWIR) detection device. Specifically, the beam splitter 418 directs short-wavelength electromagnetic radiation along the separate optical path toward a powered mirror 420, which in turn directs the electromagnetic radiation toward refractive compensation elements 422, which addresses for wave front error compensation. The refractive elements are spherical and cylindrical lens elements some of which may be laterally offset and tilted to compensate for residual wave front error of the two-element telescope design and to compensate the afocal magnification over the field of view. As a result, the separate optical path 404 has a smaller field of view, but does not have an intermediate image.

Figure 6:
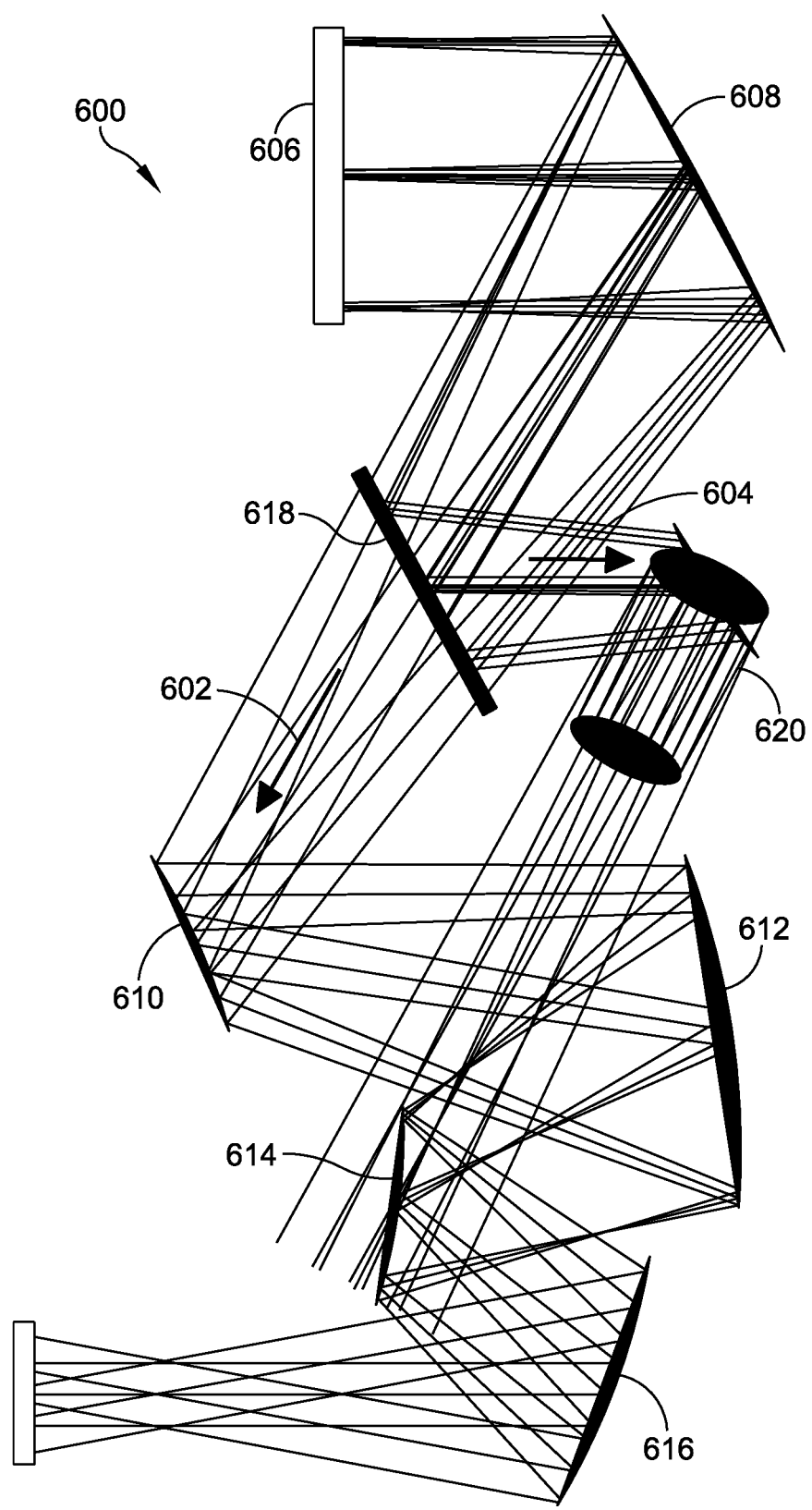
FIGS. 6 and 7 are schematic views showing an unobscured five-mirror afocal telescope having an imaging path combined with an active path with no internal focus of another embodiment of the present disclosure.
Figure 7:
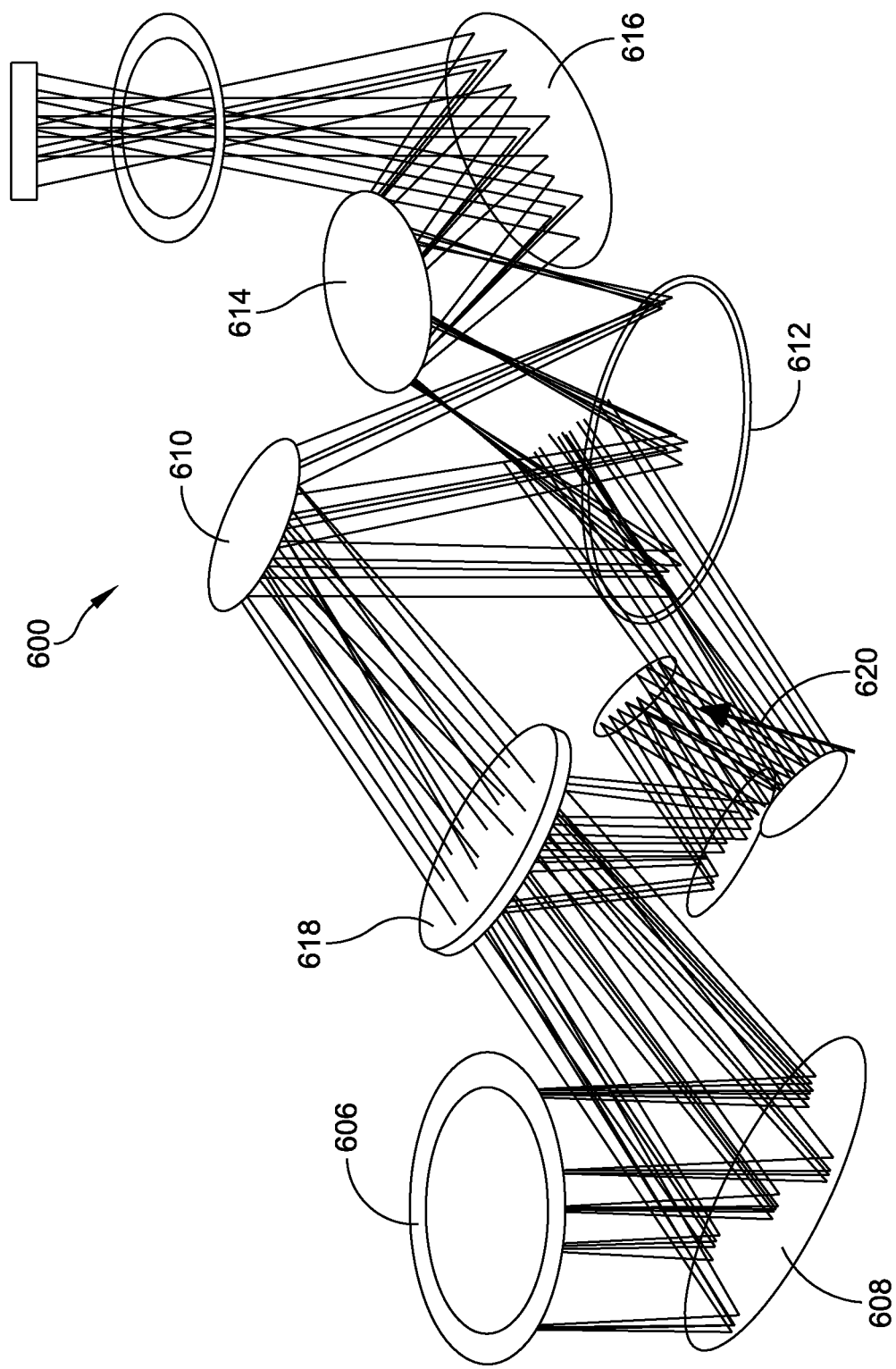

Referring to FIGS. 6 and 7, an unobscured five-mirror afocal telescope, generally indicated at 600, of another embodiment having a passive imaging path 602 and an active path 604 with no internal focus. The arrangement is such that the telescope 600 in essence creates two afocal telescopes that share a common primary mirror. Specifically, the telescope 600 includes an aperture 606 (entrance pupil) and a primary or first mirror 608 that receives electromagnetic radiation directed from the aperture 606. The telescope 600 further includes a secondary or second mirror 610 that receives electromagnetic radiation reflected from the first mirror 608. The telescope 600 further includes a third mirror 612 that receives electromagnetic radiation reflected from the second mirror 610, a fourth mirror 614 that receives electromagnetic radiation from the third mirror 612, and a fifth mirror 616 that receives electromagnetic radiation from the fourth mirror 614 and focuses the electromagnetic radiation to a real pupil image. As with telescopes 100, 300, 400, the mirrors 608, 610, 612, 614, 616 of the telescope 600 are configured to achieve a three plus two design form having a three-element objective and a two-element eyepiece.

The telescope 600 further includes a beam splitter 618 disposed between the first mirror 608 and the second mirror 610. The beam splitter 618 enables the long-wavelength electromagnetic radiation to pass through the remainder of the telescope 600 along the passive imaging path 602 and reflects a short-wavelength electromagnetic radiation along the active imaging path 604. In one embodiment, the active imaging path 604 directs the short-wavelength electromagnetic radiation to a short-wavelength infrared (SWIR) detection device. Specifically, the beam splitter 618 directs short-wavelength electromagnetic radiation along a SWIR path toward several powered, free-form mirrors, together indicated at 620, which in turn directs the electromagnetic radiation toward the detection device. As shown, all-reflective elements are in the SWIR path in which the free-form mirrors 620 compensate for wave front error and afocal magnification over the field of view.

Thus, it should be observed that embodiments of the unobscured five-mirror afocal telescope of embodiments of the present disclosure provide a broad band since it is all-reflective and diffraction-limited imaging performance over relevant tactical apertures, e.g., greater than four inches, and fields of view, e.g., greater than five degrees. Moreover, the unobscured five-mirror afocal telescope provides a higher degree of control over the angular field mapping and a means to implement wide field of view passive imaging with internal focus and active functions without an internal focus (low peak power and fluence).

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accord- ingly, the foregoing description and drawings are by way of example only, and the scope of the invention should be determined from proper construction of the appended claims, and their equivalents.

What is claimed is:

1. An unobscured five-mirror afocal telescope configured to direct electromagnetic radiation along a beam path, the telescope comprising:
    an aperture configured to direct electromagnetic radiation;
    a first powered mirror configured to receive electromagnetic radiation from the aperture and to reflect electromagnetic radiation along the beam path;
    a second powered mirror configured to receive electromagnetic radiation from the first powered mirror and to reflect electromagnetic radiation along the beam path;
    a third powered mirror configured to receive electromagnetic radiation from the second powered mirror and to reflect electromagnetic radiation along the beam path;
    a fourth powered mirror configured to receive electromagnetic radiation from the third powered mirror and to reflect electromagnetic radiation along the beam path;
    a fifth powered mirror configured to receive electromagnetic radiation from the fourth powered mirror and to reflect electromagnetic radiation along the beam path,
    wherein each of the first powered mirror, the second powered mirror, the third powered mirror, the fourth powered mirror and the fifth powered mirror is a free-form mirror having conics with general polynomial surface deformations, and
    wherein the five powered mirrors are arranged to sequentially reflect from one another electromagnetic radiation received via the aperture to produce a collimated output beam of the electromagnetic radiation at an exit pupil, the five powered mirrors consisting of a three-element objective defined by the first powered mirror, the second powered mirror and the third powered mirror and a two-element eyepiece defined by the fourth powered mirror and the fifth powered mirror; and
    a beam splitter disposed between the first powered mirror and the second powered mirror, the beam splitter being configured to direct a shorter wavelength portion of the electromagnetic radiation toward a device along a separate path.

2. The telescope of claim 1, further comprising refractive or reflective elements disposed along the separate path.

3. The telescope of claim 2, wherein refractive elements include spherical and cylindrical lenses that are laterally offset and titled with respect to one another to compensate for wave front error and afocal magnification over a field of view.

4. The telescope of claim 1, further comprising at least one powered mirror disposed along a separate path.

5. An unobscured five-mirror afocal telescope comprising:
    a first powered mirror arranged and configured to receive and reflect collimated electromagnetic radiation received via an aperture along a beam path;
    a second powered mirror arranged and configured to receive and further reflect electromagnetic radiation reflected from the first powered mirror along the beam path;
    a third powered mirror arranged and configured to receive and further reflect electromagnetic radiation reflected from the second powered mirror along the beam path;
    a fourth powered mirror arranged and configured to receive and further reflect electromagnetic radiation reflected from the third powered mirror along the beam path;
    a fifth powered mirror configured to receive and re-collimate electromagnetic radiation reflected from the fourth powered mirror and to reflect re-collimated electromagnetic radiation through an exit pupil of the afocal telescope; and
    a beam splitter disposed between the first powered mirror and the second powered mirror, the beam splitter being configured to direct a shorter wavelength portion of the electromagnetic radiation toward a device along a separate path,
    wherein each of the first powered mirror, the second powered mirror, the third powered mirror, the fourth powered mirror and the fifth powered mirror is a free-form mirror having conics with general polynomial surface deformations, and
    wherein the five powered mirrors are arranged to sequentially reflect from one another electromagnetic radiation received via the aperture to produce a collimated output beam of the electromagnetic radiation at the exit pupil, the five powered mirrors consisting of a three-element objective defined by the first powered mirror, the second powered mirror and the third powered mirror and a two-element eyepiece defined by the fourth powered mirror and the fifth powered mirror.

6. The telescope of claim 5, further comprising refractive or reflective elements disposed along the separate path.

7. The telescope of claim 6, wherein refractive elements include spherical and cylindrical lenses that are laterally offset and titled with respect to one another to compensate for wave front error and afocal magnification over a field of view.

8. The telescope of claim 5, further comprising at least one powered mirror disposed along the separate path.

9. A method of directing electromagnetic radiation along an optical path of an unobscured five-mirror afocal telescope, the method comprising:
    directing electromagnetic radiation from an aperture to a first powered mirror configured to receive electromagnetic radiation from the aperture and to reflect electromagnetic radiation along the beam path;
    directing electromagnetic radiation from the first powered mirror to a second powered mirror configured to receive electromagnetic radiation from the first powered mirror and to reflect electromagnetic radiation along the beam path;
    directing electromagnetic radiation from the second powered mirror to a third powered mirror configured to receive electromagnetic radiation from the second powered mirror and to reflect electromagnetic radiation along the beam path;
    directing electromagnetic radiation from the third powered mirror to a fourth powered mirror configured to receive electromagnetic radiation from the third powered mirror and to reflect electromagnetic radiation along the beam path;
    directing electromagnetic radiation from the fourth powered mirror to a fifth powered mirror configured to receive electromagnetic radiation from the fourth powered mirror and to reflect electromagnetic radiation along the beam path,
    wherein each of the first powered mirror, the second powered mirror, the third powered mirror, the fourth powered mirror and the fifth powered mirror is a free-form mirror having conics with general polynomial surface deformations, and wherein the five powered mirrors are arranged to sequentially reflect from one another electromagnetic radiation received via the aperture to produce a collimated output beam of the electromagnetic radiation at an exit pupil, the five powered mirrors consisting of a three-element objective defined by the first powered mirror, the second powered mirror and the third powered mirror and a two-element eyepiece defined by the fourth powered mirror and the fifth powered mirror; and directing a shorter wavelength portion of the electromagnetic radiation toward a device along a separate path.

10. The method of claim 9, wherein directing the shorter wavelength portion of the electromagnetic radiation is achieved by a beam splitter disposed between the first powered mirror and the second powered mirror.

11. The method of claim 10, wherein directing the shorter wavelength portion of the electromagnetic radiation further is achieved by refractive or reflective elements disposed along the separate path.

12. The method of claim 11, wherein refractive elements include spherical and cylindrical lenses that are laterally offset and titled with respect to one another to compensate for wave front error and afocal magnification over a field of view.

13. The method of claim 10, wherein directing the shorter wavelength portion of the electromagnetic radiation further is achieved by at least one powered mirror disposed along the separate path.

14. A method of directing electromagnetic radiation along an optical path of an unobscured five-mirror afocal telescope, the method comprising:

directing electromagnetic radiation to a first powered mirror arranged and configured to receive and reflect collimated electromagnetic radiation received via an aperture along a beam path;

directing electromagnetic radiation from the first powered mirror to a second powered mirror arranged and configured to receive and further reflect electromagnetic radiation reflected from the first powered mirror along the beam path;

directing electromagnetic radiation from the second powered mirror to a third powered mirror arranged and configured to receive and further reflect electromagnetic radiation reflected from the second powered mirror along the beam path;

directing electromagnetic radiation from the third powered mirror to a fourth powered mirror arranged and configured to receive and further reflect electromagnetic radiation reflected from the third powered mirror along the beam path;

directing electromagnetic radiation from the fourth powered mirror to a fifth powered mirror configured to receive and re-collimate electromagnetic radiation reflected from the fourth powered mirror and to reflect re-collimated electromagnetic radiation through an exit pupil of the afocal telescope; and directing a shorter wavelength portion of the electromagnetic radiation toward a device along a separate path, wherein each of the first powered mirror, the second powered mirror, the third powered mirror, the fourth powered mirror and the fifth powered mirror is a free-form mirror having conics with general polynomial surface deformations, and wherein the five powered mirrors are arranged to sequentially reflect from one another electromagnetic radiation received via the aperture to produce a collimated output beam of the electromagnetic radiation at the exit pupil, the five powered mirrors consisting of a three-element objective defined by the first powered mirror, the second powered mirror and the third powered mirror and a two-element eyepiece defined by the fourth powered mirror and the fifth powered mirror.

15. The method of claim 14, wherein directing the shorter wavelength portion of the electromagnetic radiation is achieved by a beam splitter disposed between the first powered mirror and the second powered mirror.

16. The method of claim 15, wherein directing the shorter wavelength portion of the electromagnetic radiation further is achieved by one of refractive elements and at least one powered mirror disposed along the separate path.

17. The method of claim 16, wherein refractive elements include spherical and cylindrical lenses that are laterally offset and titled with respect to one another to compensate for wave front error and afocal magnification over a field of view.

18. An unobscured five-mirror afocal telescope comprising:

five powered mirrors arranged to sequentially reflect from one another electromagnetic radiation received via a system entrance pupil to produce a collimated output beam of the electromagnetic radiation at a system exit pupil, the five mirrors consisting of a three-element objective defined by a first powered mirror, a second powered mirror and a third powered mirror and a two-element eyepiece defined by a fourth powered mirror and a fifth powered mirror, wherein each powered mirror is a free-form mirror having conics with general polynomial surface deformations; and a beam splitter disposed between the first powered mirror and the second powered mirror, the beam splitter being configured to direct a shorter wavelength portion of the electromagnetic radiation toward a device along a separate path.

19. The telescope of claim 18, further comprising refractive or reflective component elements disposed along a separate path.

20. The telescope of claim 18, further comprising at least one powered mirror disposed along a separate path.

21. The telescope of claim 18, wherein the five powered mirrors consist of:

the first powered mirror arranged and configured to receive and reflect electromagnetic radiation from the entrance pupil along a beam path;

the second powered mirror arranged and configured to receive and further reflect electromagnetic radiation reflected from the first powered mirror along the beam path;

the third powered mirror arranged and configured to receive and further reflect electromagnetic radiation reflected from the second powered mirror along the beam path;

the fourth powered mirror arranged and configured to receive and further reflect electromagnetic radiation reflected from the third powered mirror along the beam path; and the fifth powered mirror configured to receive and re-collimate electromagnetic radiation reflected from the fourth powered mirror and to reflect re-collimated electromagnetic radiation through the exit pupil to provide the collimated output beam.

22. An unobscured five-mirror afocal telescope comprising:
- five powered mirrors arranged to sequentially reflect from one another electromagnetic radiation received via a system entrance pupil to produce a collimated output beam of the electromagnetic radiation at a system exit pupil, the five mirrors consisting of a three-element objective defined by a first powered mirror, a second powered mirror and a third powered mirror and a two-element eyepiece defined by a fourth powered mirror and a fifth powered mirror,
- wherein each powered mirror is a free-form mirror having conics with general polynomial surface deformations; and
- refractive or reflective component elements disposed along a separate path,
- wherein refractive elements include spherical and cylindrical lenses that are laterally offset and titled with respect to one another to compensate for wave front error and afocal magnification over a field of view.

* * * * *